Sept. 13, 1932. L. C. PIAZZA 1,877,047
METHOD OF AND MEANS FOR MAKING SLABS
Filed Nov. 20, 1930 2 Sheets-Sheet 1

Witness:
William P. Kilroy

Inventor:
Louis C. Piazza
By Brown, Jackson, Boettcher & Dienner
Attys

Sept. 13, 1932.   L. C. PIAZZA   1,877,047
METHOD OF AND MEANS FOR MAKING SLABS
Filed Nov. 20, 1930   2 Sheets-Sheet 2

Patented Sept. 13, 1932

1,877,047

UNITED STATES PATENT OFFICE

LOUIS C. PIAZZA, OF WESTERN SPRINGS, ILLINOIS, ASSIGNOR TO SOUNDEX CORPORATION, OF CHICAGO, ILLINOIS, A CORPORATION OF ILLINOIS

METHOD OF AND MEANS FOR MAKING SLABS

Application filed November 20, 1930. Serial No. 496,879.

The present invention relates to a method of and means for making slabs and more particularly to the manufacture of light weight building material having heat insulating and sound absorptive qualities.

More specifically, the present invention may be characterized as an improvement in the process of and means for making slabs disclosed in the co-pending application of Herbert Libberton, Serial No. 429,587, filed February 19, 1930, for method of and means for making insulating slabs.

In the above noted application, there is disclosed a method of and means for the manufacture, by continuous process, of a building material having the qualities of light weight fibrous building materials now known and which, in addition to being inexpensive to manufacture, is permanent, water resistant, fire resistant, and heat and sound insulating, such material being composed of vegetable fibers, such, for example, as excelsior, wood wool or the like, promiscuously intertwined and bonded together by a suitable cementitious binder or adhesive such, for example, as sodium silicate mixed with calcium carbonate. For a more specific description of the physical construction and characteristics of the finished product, reference may be had to the co-pending application of Cass L. Kennicott and Herbert Libberton, Serial No. 313,402, filed October 19, 1928, for mold and slab machine which has become Patent 1,848,354.

Briefly, the process disclosed in the first noted application comprises, in its most specific aspect, mixing of a cementitious binder, cutting up or mincing vegetable fibers to a proper length, conveying both the binder and fibers to a coater, coating the fibers with the cementitious binder, feeding the coated fibers in a uniform, loose mass to a combined compressor and setting accelerator, compressing and setting the loose mass of coated fibers whereby the mass assumes the form of a continuous sheet, finishing the edges of the continuous sheet, and cutting the sheet into slabs or plaques of any desired or preferred length.

More specifically, the present invention is directed to the improvement of that portion of the process and apparatus for introducing the coated fibers in a uniform, loose mass to the compressor and setting accelerator.

In the above briefly described process and apparatus, the coated fibers are deposited in a uniform, loose mass upon a supporting conveyor having its upper run extending into and passing through the compressor and setting accelerator. As the deposited mass is carried to the main body portion of the compressor and setting accelerator, and upon its introduction into such mechanism, the mass is compressed by a cooperating upper conveyor or hold down conveyor, the lower run of which is adapted to pass through the mechanism in vertically spaced relation to the supporting conveyor whereupon the individual fibers of the mass are held rigid to one another while the mass is moved through passes of pre-heated gases or air for accelerating the setting of the binder of the coated fibers. Prior to the introduction of the loose mass of fibers which is of substantially greater depth than the compressed mass, the loose mass is guided along its sides by a pair of flanking guide plates. Co-operating with such guide plates at the point of introduction of the loose mass into the main body portion of the mechanism, are interchangeable guide plates which prevent lateral expansion of the moving mass at the point of initial compression thereof. Due to the lateral compression imposed upon the moving mass and the fact that at the point of introduction of the mass into the main body portion of the mechanism, the binder is quite moist, there is a tendency of the binder coated fibers defining the edges of the moving mass to adhere to the inner side faces of the interchangeable guide plates. Such coated fibers as tend to adhere to these guide plates accumulate and the resultant accumulation tends to disrupt the uniformity of the lateral edges of the moving mass of following material in time.

The present invention is primarily directed to the elimination of such a crust formation at the point of entry of the moving mass into the compressor and setting accelerator whereby this objectionable feature is obviated. To this end, it is proposed in the present improved process and apparatus, to form a crust along the side edges of the moving loose mass by accelerating the setting of the binder of the coated fibers along the side edges of the moving mass prior to the introduction of the mass into the compressor and setting accelerator. By providing such a crust along the side edges of the moving mass, adhesion of the fibers defining the side edges of the moving mass to the guide plates and succeeding side guide members of the compressor and setting accelerator is completely eliminated.

Another feature of the present invention contemplates the provision of means for forming such crusts.

A further feature resides in the association of a suitable heating means for the interchangeable guide plates whereby the setting of the binder of the coated fibers defining the side edges of the moving mass, is accelerated prior to the introduction thereof into the mechanism proper, causing the formation of the crusts.

Another feature of the present invention contemplates the positioning of the guide plates at the introductory portion of the mechanism to laterally compress the moving mass concurrently with the formation of the crusts.

Other and further features of the present invention will appear from the following detailed description of a preferred embodiment of the apparatus incorporating the salient features of the present invention for carrying out the novel process, illustrated in the accompanying drawings in which.

In order to simplify the disclosure of the process and to more readily acquaint those skilled in the art with the novel steps of that portion of the process to which the present invention apertains, I shall first describe the apparatus employed.

Figure 1:
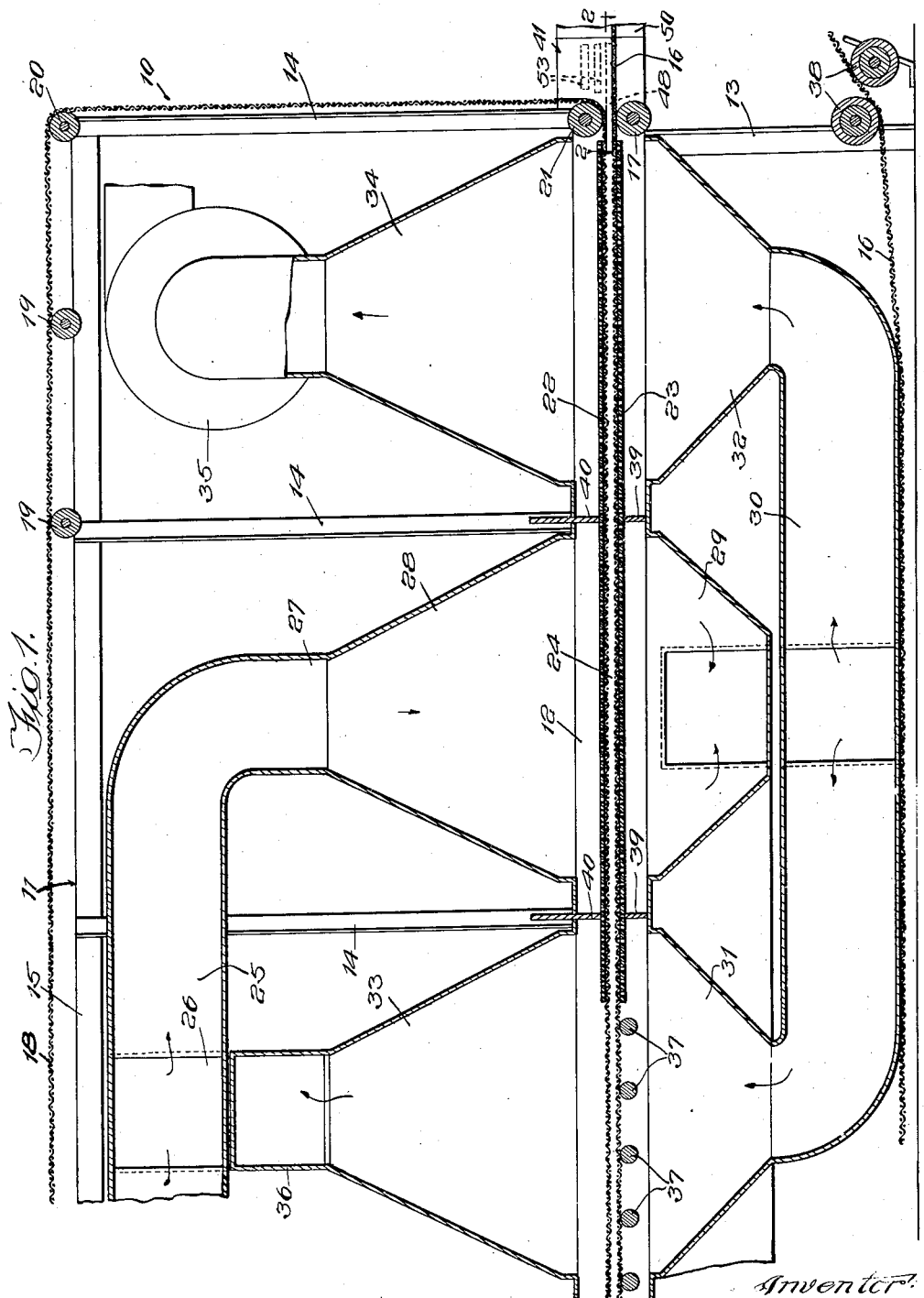
Figure 1 is a fragmentary vertical section of a compressor and setting accelerator embodying the salient features of the present invention.

Referring now more particularly to Figure 1, I have illustrated a vertical section through the major portion of a compressor and setting accelerator generally indicated at 10 of the character disclosed in the above noted application of Herbert Libberton. This compressor and setting accelerator 10 is mounted upon a supporting structure comprising a framework 11 having two parallel intermediate members 12 supported upon a plurality of downwardly extending legs such as 13 and an upwardly extending intermediate framework comprising upwardly extending standards 14 connected together at their upper ends by means of horizontal members 15. The entire framework 11 may be suitably braced by struts arranged in any preferred or desired manner (not shown).

As has been hereinbefore pointed out, compressor and setting accelerator 10 is adapted to receive binder coated fibers in a loose mass for compressing such mass and accelerating the setting of the binder under compression in the course of its passage through such mechanism. Preferably, the coated fibers are deposited in a substantially uniform loose mass upon the horizontally disposed upper run of a moving reticulated belt 16 passing over a direction change means such, for example, as a roller (not shown) disposed at the extreme end of the reception portion of the mechanism. In the course of travel of the upper run of conveyor 16 at the reception end of the mechanism, the upper run is supported upon a suitably arranged series of rollers, the last of which in the direction of the discharge end of the mechanism, is roller 17 suitably journaled between the intermediate members 12.

An upper cooperating belt has its upper run suitably supported upon a series of rollers 19 suitably journaled in the horizontal side frame members 15. The upper run of conveyor or belt 18 is directed downwardly over the end of the upper portion of the framework 11 over a roller 20, passing downwardly in parallel relation to the end vertical supporting members 14 and being then directed through the mechanism by passing over a roller 21 adjustably disposed above and in parallel relation to roller 17. The lower run of belt 18 is thus guided through the body portion of the mechanism in spaced relation to the upper run of conveyor 16.

Inasmuch as the cementitious binder employed is not flexible while setting, the material passing through the first portion of the setting period must be held rigid, for the reason that any movement of the fibers relative to one another during the setting process would break up the bond to the extent that the finished product would have very little or no strength. Further, since the belts or conveyors 16 and 18 are flexible, after compression of the mass between rollers 17 and 21, there would be a tendency on the part of the mass to again expand, thereby spreading the belts apart. To maintain the mass in compressed condition and to simultaneously retain the individual fibers of the mass rigid to one another, a pair of perforated plates 22 and 23 of special non-buckling alloy steel are provided, plate 22 serving to back the lower run of the upper conveyor or belt 18, while plate 23 serves to back the upper run of the lower conveyor or belt 16.

Inasmuch as the edges of reticulated belts such as 16 and 18 cannot be smooth nor the width maintained constant, side guides 24 are suitably secured to the inner faces of the side members 12, such guides being disposed between the belts and slightly inwardly of the edges thereof to prevent running over of the material at the edges of the belts and to aid in the retention of rigidity of the material disposed between the belts during the first portion of movement thereof through the mechanism. Roller 21 and plate 22 are preferably arranged for vertical adjustment whereby the depth of the compressed material may be controlled, guides 24 being of interchangeable character whereby others of varying depth may be substituted therefor to accommodate the various adjustments of roller 21 and plate 22.

To accelerate the setting of the binder, the mechanism 10 has been provided with a circulation system whereby preheated gas or air or any suitable or preferable intermixture of the two is passed through the belts 16 and 18 and plates 22 and 23. The accelerating gases are suitably preheated in furnaces, the outlet pipe of one of which is connected with an inverted U-shaped inlet pipe 25 positioned substantially centrally of the mechanism directly underneath transverse members connecting the horizontal upper members 15 of the frame, the juncture of such pipes being indicated at 26. The right hand end 27 of pipe 25 is connected to a downwardly flared vent 28 directing a blast of preheated gas or air through plate 22, belts 18 and 16, and lower plate 23, being also adapted to pass through the material being carried by belt 16.

After passing through the material at this point, the gas or air is returned to the furnaces by a return connection pipe associated with an upwardly flared vent 29 disposed underneath vent 28. The gases or air thus returned to the furnaces are thence again introduced into the mechanism 10 by a suitable pipe connected with a pipe 30 of U-shaped formation having the legs thereof connected to upwardly flared vents 31 and 32 flanking vent 29 and disposed respectively below downwardly flared vents 33 and 34. The gas or air passing up through vent 32, the belts and associated plates and material is exhausted from vent 34 by means of a suitable fan or blower 35 to the open atmosphere. It will be readily apparent that gas or air at relatively high temperature passes through the portion of the moving mass first introduced into the mechanism 10. Gas or air passing up through vent 31, through the belts and material and through vent 33 is returned to the furnaces by means of a suitable pipe 36. Gas or air introduced into pipe 25 and passing through the left leg of such pipe as viewed in Figure 1, is likewise returned to the furnaces after passing through the belts and material. Preferably, the cold air or gases are drawn in for conduction to the furnaces through a vent disposed at the discharge end of the mechanism for cooling the moving compressed mass of material which has already had its binder completely set.

Upon leaving the discharge end of plate 23, the upper run of lower conveyor or belt 16 is freely carried upon a series of rollers inasmuch as upon discharge of the material from the discharge end of plates 22 and 23, the binder has sufficiently set whereby the material will maintain its own rigidity. The lower run of upper conveyor or belt 18 may at this point freely rest upon the moving mass or sheet of material. To prevent adhesion of the binder coated fibers to the lower conveyor or belt 16, the lower run of such conveyor or belt is guided between two proximately disposed oiled rollers 38, while conveyor 18 may be similarly coated with oil to prevent adhesion by rollers 19 and 20 which may likewise be of felt and oiled. To prevent passage of gas or air from and to adjacently disposed vents, a plurality of fixed baffle plates 39 are disposed transversely between side plates 12, similarly disposed adjustable baffle plates 40 being disposed above baffle plates 39, baffle plates 40 being vertically adjustable to accommodate adjustments of upper plate 22 and the lower run of upper conveyor 18.

Since guide plates 24 are disposed inwardly of the edges of conveyors or belts 16 and 18, it will be apparent that the mass being compressed between rollers 17 and 21 must be retained against lateral displacement at the point of entry of the moving mass until the guide plates 24 take up this function. To this end, suitable interchangeable guide plates such as 41 are provided. Heretofore, these guide plates served no other purpose than to suitably prevent the material from oozing out at the sides of the belts due to the transverse compression of rollers 17 and 21. Inasmuch as the coated fibers introduced at this point are quite moist, there was a tendency of the moist fibers to adhere to the inner faces of these guide plates, such tendency resulting in time in accumulation at these points of caked or hardened fibers to such an extent that the finished product resulted in having edges of irregular configuration and also in the course of operation of the mechanism, the resultant caked and hardened material caused piling up of the loose mass about to be introduced into the compressor and setting accelerator due to the resistance thereof to the smooth passage or introduction of the loose mass into the mechanism. This requires stopping of the mechanism for purposes of removing the caked or hardened adhering matter or substitution for the so effected plates by clean plates, in either case delaying the continuous operation upon the moving mass. To eliminate this condition, the present invention contemplates the provision of novel means for forming a crust along the side edges of the moving mass prior to its introduction into the compressor and setting accelerator 10.

Figure 2:
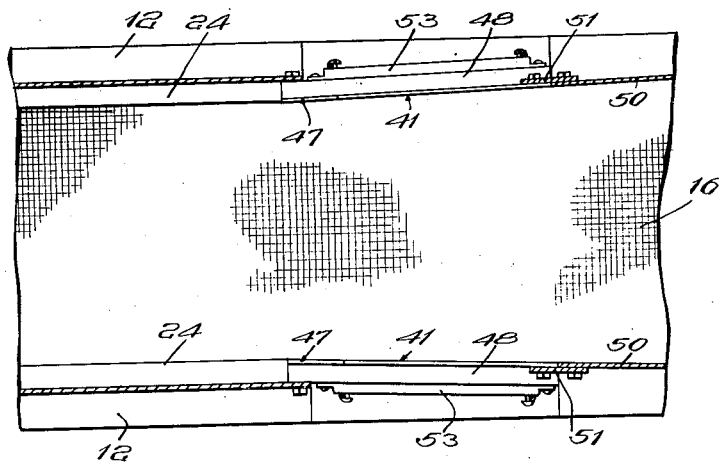
Figure 2 is an enlarged section taken substantially along the line 2—2 of Figure 1.
Figure 3:
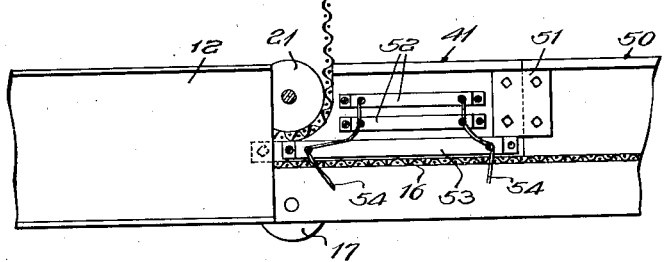
Figure 3 is an enlarged fragmentary side elevation of the introductory end of the compressor and setting accelerator illustrated in Figure 1.
Figure 4:
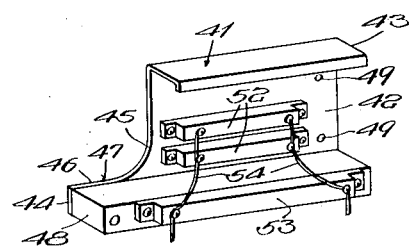
Figure 4 is an enlarged perspective view of an interchangeable guide plate embodying the features of the present invention.

Referring now more particularly to Figures 2, 3 and 4, the interchangeable guiding plates 41 each comprise a body portion 42, the upper edge of which is reversely bent outwardly to provide a strengthening flange 43. The rear end edge of the body portion 42 is straight while the forward edge of the body portion comprises a straight edge 44 and a curved edge 45 extending downwardly from the flange 43 and merging into a horizontal straight upper edge 46, curved edge 45 and straight edges 46, 44 and the lower horizontal straight edge of the body portion 42 defining an extension 47. Curved edge or portion 45 is of a curvature to fit the configuration of the upper conveyor 18 as it passes over and under roller 21. Along the lower edge and on the outer face of body portion 42 there is provided a suitably secured block 48 which is of a depth corresponding to the depth of the side guides 24 whereby the depth to which the loose mass is to be compressed may be readily adjusted by adjustments of roller 21 and plate 22. The rear end of the body portion 42 is provided adjacent the rear edge with suitable perforations 49 for receiving suitable securing means for fastening plate 41 to the adjacent end of a guide plate 50 disposed above conveyor 16 at the reception end of such conveyor. A suitable plate 51 may be employed to provide such connection and for maintaining guides 50 and plates 41 in alignment.

Preferably, plates 41 in accordance with the present invention, are disposed to converge toward each other in the direction of movement of the mass of deposited material for imposing a slight compression upon the edges of the moving mass prior to the transverse compression thereof by and between rollers 17 and 21.

To prevent adhesion of the fibers defining the edges of the moving mass to the side interchangeable guide plates 41, each plate is provided on its outer side face with one or more electrical heating units of any suitable or preferred construction and a similar but larger electrical heating unit 53 is suitably secured to the outer side of block 48. Such heating units may be suitably connected in parallel by means of electrical conduits 54 which may in turn be plugged into a line providing a source of electrical current supply for the heating units. Preferably, the heating units are adapted to maintain plates 41 at a temperature sufficient to cause rapid setting of the binder of the coated fibers defining the side edges of the moving mass whereby a crust is formed along the side edges of the moving mass prior to its introduction into the compressor and setting accelerator. Such crust formation being of a rapidly formed nature eliminates adhesion of the moist or "wet" binder coated fibers to the guides 41 at the point of compression of the moving mass by rollers 17 and 21 resulting in the entire elimination of the tendency of such moist or "wet" fibers to adhere to both side plates 41 and succeeding guides 24 at the point of introduction of the mass into the mechanism 10. By positioning the side guide plates 41 for convergence in the direction of movement of the mass, a slight lateral compression is set up in the loose mass whereby rapid heat transfer by intimate contact is effected to the fibers defining the side edges of the moving mass causing rapid setting of the binder of such fibers.

While I have disclosed a preferred embodiment of the apparatus for carrying out the novel steps of the herein described process, I do not wish to be limited thereto. As will be understood by those skilled in the art, changes may be made therein without departing from the essence of the invention or the spirit and scope of the appended claims.

What I claim and desire to secure by Letters Patent is:

1. In a process of forming heat and sound insulating material of binder coated fibers adapted to be placed under compression, a method of accelerating the setting of the binder of a moving mass of said fibers which comprises forming a crust along the side edges of the moving mass prior to compressing the mass.

2. In a process of forming heat and sound insulating material of binder coated fibers adapted to be placed under compression, a method of accelerating the setting of the binder of a moving mass of said fibers which comprises laterally compressing the moving mass, and forming a crust upon the lateral edges of the moving mass prior to placing the mass under transverse compression.

3. In a process of forming heat and sound insulating material of binder coated fibers adapted to be placed under compression, a method of accelerating the setting of the binder of a moving mass of said fibers which comprises laterally compressing the moving mass in the direction of movement of the mass, and accelerating the setting of the binder of the coated fibers along the lateral edges of the moving mass whereby a crust is formed along such lateral edges prior to transverse compression of the moving mass.

4. In a process of forming heat and sound insulating material of binder coated fibers adapted to be placed under compression, a method of accelerating the setting of the binder of a moving mass of said fibers which comprises placing a loose mass of moving fibers under lateral compression, forming a crust by accelerating the setting of the binder along the side edges of the moving mass, and subsequently compressing the mass transversely.

5. In a process of forming heat and sound insulating material of binder coated fibers adapted to be placed under compression, a method of accelerating the setting of the binder of a moving mass of said fibers which comprises placing a loose mass of moving fibers under lateral compression, forming a crust by accelerating the setting of the binder along the edges of the moving mass, and subsequently setting the binder of the entire mass under transverse compression.

6. In a process of forming heat and sound insulating material of binder coated fibers adapted to be placed under compression, a method of accelerating the setting of the binder of a moving mass of said fibers which comprises placing a loose mass of moving fibers under lateral compression, concurrently forming a crust by accelerating the setting of the binder along the edges of the moving mass, and subsequently setting the binder of the entire mass under transverse compression.

7. A process of forming heat and sound insulating material of binder coated fibers in an apparatus wherein the binder tends to adhere to the material of the apparatus which comprises placing a moving mass of the fibers under lateral compression, and accelerating the setting of the moving loose mass along the portions of the mass contacting the apparatus whereby adhesion of the binder to the apparatus is eliminated.

8. A process of forming heat and sound insulating material of binder coated fibers in an apparatus wherein the binder tends to adhere to the material of the apparatus which comprises forming a crust along the portions of the mass contacting the apparatus by rapidly accelerating the setting of the binder of the moving mass.

9. A process of forming heat and sound insulating material of binder coated fibers in an apparatus wherein the binder tends to adhere to the material of the apparatus which comprises preheating of a portion of the contacted apparatus causing a rapid acceleration of setting of the binder of the moving mass along the contacting portion of the moving mass whereby a non-adhesive crust is formed in the mass.

10. A process of forming heat and sound insulating material of binder coated fibers in an apparatus wherein the binder tends to adhere to the material of the apparatus which comprises preheating of a portion of the contacted apparatus causing a rapid acceleration of setting of the binder of the moving mass along the contacting portion of the moving mass whereby a non-adhesive crust is formed in the mass and subsequently setting the binder of the mass intermediate the crusted portions.

11. In an apparatus for forming heat and sound insulating material of binder coated fibers, means for guiding a loose mass of moving fibers, and means for forming a crust along the edges of said mass.

12. In an apparatus for forming heat and sound insulating material of binder coated fibers, means for guiding a loose mass of moving fibers, and means for laterally compressing the mass and simultaneously forming a crust along the edges of said mass.

13. In an apparatus for forming heat and sound insulating material of binder coated fibers, means for guiding a loose mass of moving fibers, means for laterally compressing the mass in the direction of movement of the mass, and means for maintaining said last named means at high temperature for forming a crust along the edges of the moving for forming insulating material from binder along such edges.

14. A compressor and setting accelerator for forming insulating material from binder coated fibers comprising means for receiving and conveying a loose mass of fibers, means cooperating with said means for compressing said mass, and means for guiding said mass for compression and adapted to form a crust along the lateral edges of said mass.

15. A compressor and setting accelerator for forming insulating material from binder coated fibers comprising means for receiving and conveying a loose mass of fibers, means cooperating with said means for compressing said mass, and means for guiding said mass for compression including means effective to prevent adhesion of said coated fibers to said guiding means.

16. A compressor and setting accelerator for forming insulating material from binder coated fibers comprising means for receiving and conveying a loose mass of fibers, means cooperating with said means for compressing said mass, means for guiding said mass for compression, and means adapted to accelerate setting of binder along the lateral edges of said mass whereby a non-adhesive crust is formed along said edges.

17. A compressor and setting accelerator for forming insulating material from binder coated fibers comprising means for receiving and conveying a loose mass of fibers, means cooperating with said means for compressing said means, means for guiding and laterally compressing said moving mass, and means associated with said guiding means and effective to accelerate setting of the binder along the lateral edges of said mass whereby a non-adhesive crust is formed along said edges prior to transverse compression of said moving mass.

18. A compressor and setting accelerator for forming insulating material from binder coated fibers comprising means for receiving and conveying a loose mass of fibers, means cooperating with said means for compressing said mass, means guiding said mass toward said cooperating means, means cooperating with said guiding means and said second named cooperating means adapted to laterally compress said moving mass, and means associated with said guiding means cooperating means effective to accelerate setting of the binder along the lateral edges of said moving mass whereby a non-adhesive crust is formed along said edges prior to transverse compression of said mass.

19. A compressor and setting accelerator for forming insulating material from binder coated fibers comprising a conveyor for receiving a loose mass of said fibers, a cooperating conveyor cooperating with said conveyor for compressing said mass therebetween, guide plates disposed adjacent the edges of said first conveyor for guiding the mass for compression by said conveyors, and means associated with said guide plates for partially setting the binder of said mass prior to compression thereof whereby a non-adhesive crust is formed along the sides of said mass.

20. A compressor and setting accelerator for forming insulating material from binder coated fibers comprising a conveyor for receiving a loose mass of said fibers, a cooperating conveyor cooperating with said conveyor for compressing said mass therebetween, guide plates disposed adjacent the edges of said first conveyor for guiding the mass for compression by said conveyors and converging in the direction of movement of said mass for laterally compressing the mass, and heating means associated with said guide plates on the outer sides thereof for maintaining said guide plates at a temperature sufficient to cause setting of the binder of said mass along the guide plate contacting edges thereof whereby a non-adhesive crust is formed at said edges of the mass prior to compression thereof by said cooperating conveyors.

In witness whereof, I hereunto subscribe my name this 17th day of November, 1930.

LOUIS C. PIAZZA.

CERTIFICATE OF CORRECTION.

Patent No. 1,877,047.  September 13, 1932.

LOUIS C. PIAZZA.

It is hereby certified that error appears in the printed specification of the above numbered patent requiring correction as follows: Page 5, line 94, claim 13, strike out the words "for forming insulating material from" and insert instead mass by accelerating setting of the; and that the said Letters Patent should be read with this correction therein that the same may conform to the record of the case in the Patent Office.

Signed and sealed this 22nd day of November A. D. 1932.

(Seal)

M. J. Moore,
Acting Commissioner of Patents.